April 9, 1963  E. G. HILL  3,084,514
VEHICLE POWER BRAKE MECHANISM
Filed Sept. 28, 1961  3 Sheets-Sheet 1
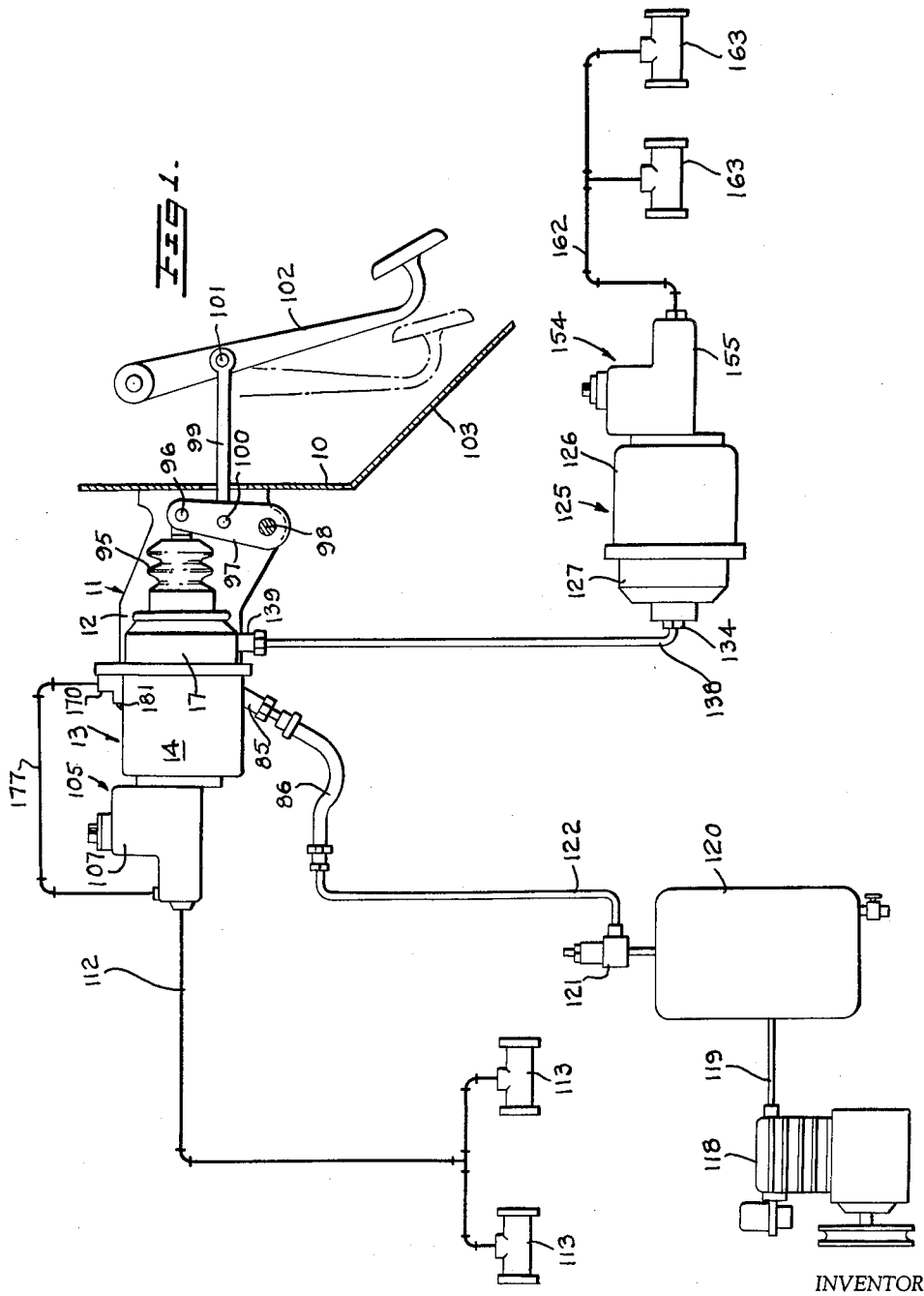
INVENTOR.
EDWARD GOVAN HILL
BY
*John K. Phillips*
ATTORNEY

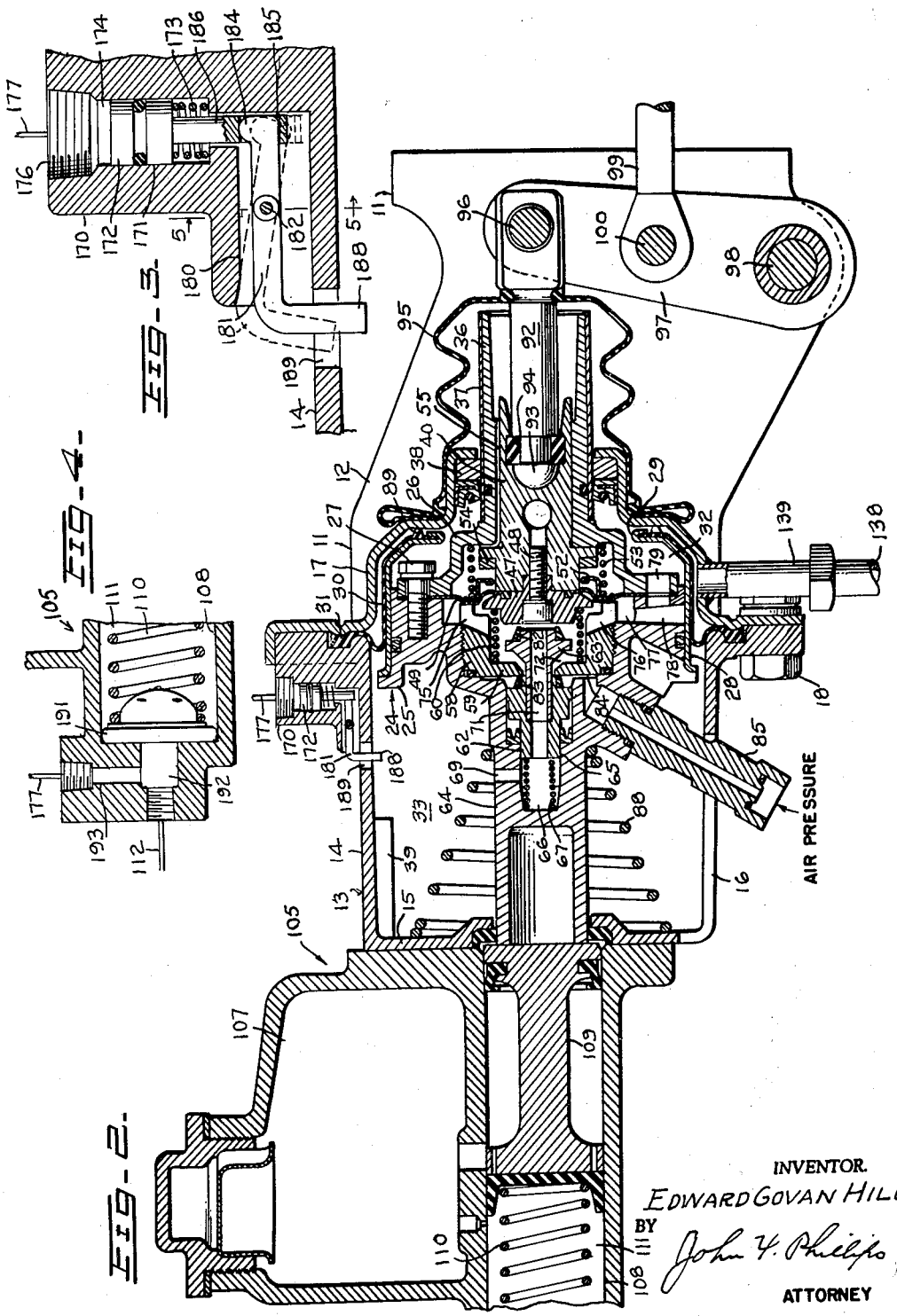

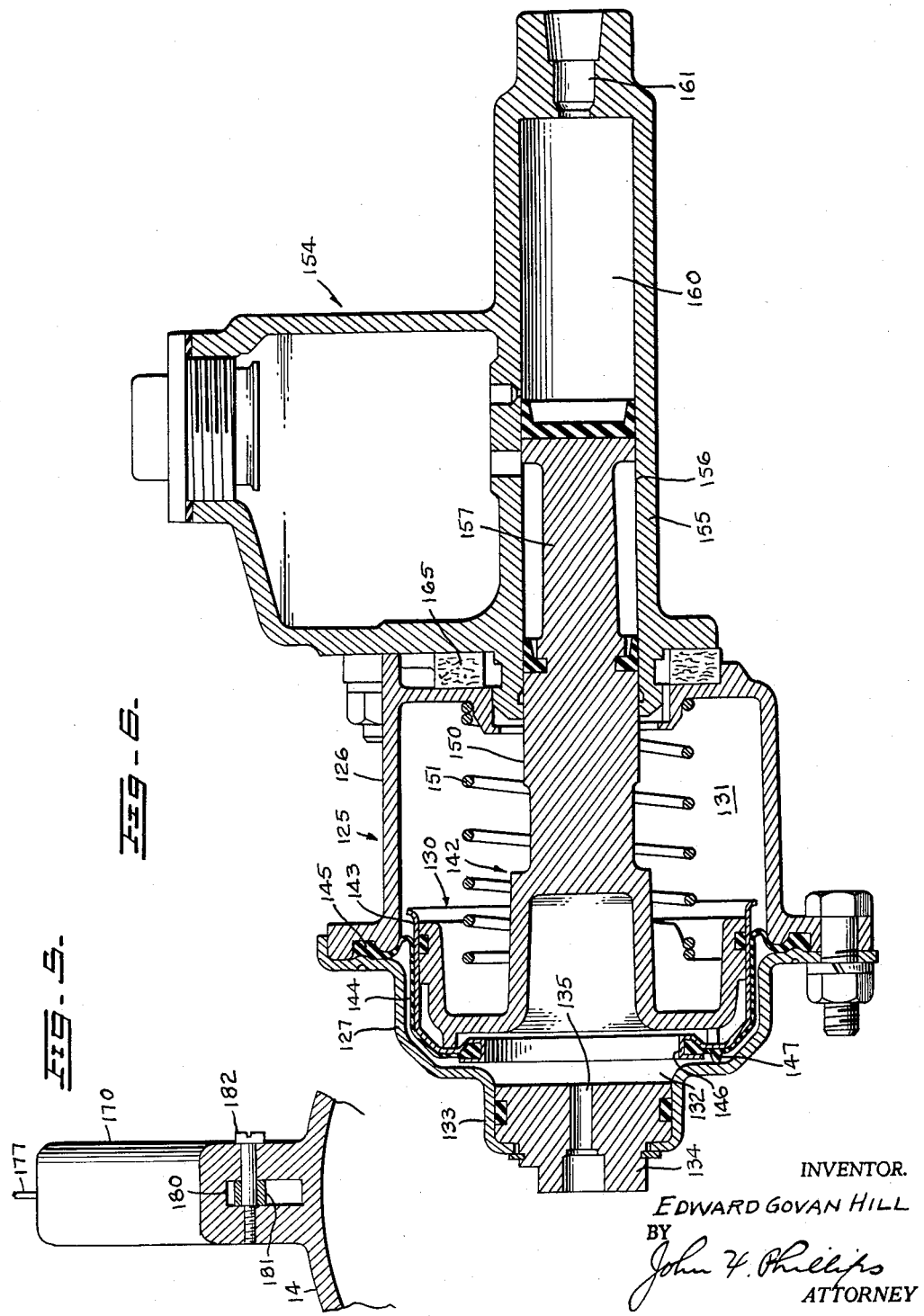

3,084,514
Patented Apr. 9, 1963

3,084,514
VEHICLE POWER BRAKE MECHANISM
Edward Govan Hill, Birmingham, Mich., assignor to Kelsey-Hayes Company, Romulus, Mich., a corporation of Delaware
Filed Sept. 28, 1961, Ser. No. 141,391
12 Claims. (Cl. 60—54.5)

This invention relates to a motor vehicle power brake mechanism and is an improvement over the mechanism shown in my copending application Serial No. 802,349, filed March 27, 1959, now Patent No. 3,035,552.

In my copending application referred to there is disclosed a brake system employing two master cylinders, one operated by a master motor and the other by a slave motor. The master motor is controlled by a valve mechanism connected to the brake pedal and the associated master cylinder supplies hydraulic braking pressures to the front wheels of the vehicle. The master motor is provided with a pressure operated piston controlled by the valve mechanism, and operation of the pedal is adapted to assist the motor piston in developing braking pressures. Thus, the master motor is of the booster type and the generation of pressures for applying the front wheel brakes is limited only by the ability of the operator to exert force against the brake pedal.

In the copending application the slave motor is employed solely for operating the rear vehicle brakes and is subject to operation solely in accordance with pressures developed in the master motor, the pressure chamber of the slave motor communicating with the pressure chamber of the master motor. Thus pressures developed in the master motor by operation of the valve mechanism will be duplicated in the slave motor, which is not subject to any pedal booster forces. Thus the rear brakes can be applied only to the extent of the maximum pressures which can be developed in the slave motor. Thus the system is highly advantageous in that substantially greater braking pressures can be applied at the front wheel brakes than at the rear wheel brakes, and accordingly the tendency for the rear brakes to lock the rear wheels of the vehicle and cause them to slide is minimized.

The system of the copending application therefore is highly advantageous and the limiting of the tendency for the rear wheels to lock under the application of heavy braking force provides a highly important safety feature particularly for vehicles such as school buses. The master motor of the earlier construction has movement of its piston limited at a point preceding the point where the brake pedal reaches its limit of movement. Therefore in the event of a rupture in the hydraulic lines to the front wheel brakes, the piston of the master motor will move to its limit, leaving sufficient pedal travel for the operation of the valve mechanism to energize the slave motor to effect the braking of the rear wheels to bring the vehicle to a stop, and accordingly the system has this second highly important safety feature.

The system of prior construction possesses what might be termed a psychological disadvantage. It has been found that operators of vehicles equipped with this system feel the pedal "give" rapidly in the event of a rupture in the front wheel fluid lines and there is a tendency for the operator to believe that by "pumping" the brake pedal he can reestablish pressure in the front wheel hydraulic lines. This of course is impossible where a rupture has occurred in one of these lines, and the operator thus may fail to appreciate the fact that by simply moving the brake pedal beyond the point at which it is located when the piston of the master motor reaches its limit of travel, the valve mechanism of the master motor can be operated to establish brake-operating pressures in the slave motor.

An important object of the present invention is to provide novel automatic means for limiting the travel of the piston of the master motor in the event of a drop in pressure in the fluid lines to the front wheel brake cylinders to minimize the chance that the operator will attempt to pump the brake pedal and thus will follow through with brake pedal operation to energize the slave motor to apply the rear wheel brakes.

A further object is to provide a system wherein the piston of the master motor, under normal operating conditions, is adapted to travel the full distance necessary for the full application of the front wheel brakes, but wherein in the event of a loss in pressure in the front wheel fluid lines, the travel of the piston of the master motor is automatically shortened, whereupon additional movement of the brake pedal operates the valve mechanism to energize the slave motor and apply the rear wheel brakes.

More specifically an object of the invention is to provide a mechanism of the character referred to having an abutment normally arranged out of the path of travel of the piston of the master motor, the abutment being held in such normal position when pressure is present in the fluid lines to the front wheel brakes and being biased to an operative position in the path of travel of the master cylinder piston so as to move to such position upon a failure in pressure in the fluid lines to the front wheel brake cylinders to arrest the master motor piston and the valve mechanism carried thereby but so that the operator will conveniently and logically move the brake pedal to energize the slave motor.

Other objects and advantages of the invention will become apparent during the course of the following description.

In the drawings I have shown one embodiment of the invention. In this showing

FIGURE 1 is a generally diagrammatic view in the entire brake system;

FIGURE 2 is an enlarged fragmentary axial sectional view through the booster or master motor and associated elements, the parts being shown in normal positions except that the present device is shown in operative position;

FIGURE 3 is an enlarged sectional view of the present device shown in normal position in dotted lines and in operative position in solid lines;

FIGURE 4 is a fragmentary sectional view taken axially through the outlet of the master cylinder for the front wheel brakes;

FIGURE 5 is a detailed fragmentary sectional view from line 5—5 of FIGURE 3; and FIGURE 6 is an axial sectional view through the slave motor and associated elements, the parts being shown in normal off positions.

Refering particularly to FIGURE 1, the numeral 10 indicates the fire wall for a motor vehicle having a U-shaped bracket 11 fixed against the forward face thereof and provided with parallel side walls 12. These walls forwardly thereof support a booster motor indicated as a whole by the numeral 13.

The motor 13 comprises a generally cylindrical forward housing 14 having a forward end wall 15, and the bottom of the housing 14 is slotted as at 16 for a purpose to be described. The motor also includes a rear housing member 17, and the two motor housing members are bolted together as at 18 (FIGURE 2). Opposite sides of the motor are suitably secured to the forward extremities of the bracket side walls 12.

Within the motor is a pressure responsive unit indicated as a whole by the numeral 24 (FIGURE 2) comprising preferably die-cast body sections 25 and 26 secured together as at 27. The body member 25 has a cylindrical outer surface on which is pressed an annular preferably pressed steel member 28 extending rearwardly of the body member 25 and having a radially inward extremity 29 crimped over to clamp in position the inner periphery of a rolling diaphragm 30. Such diaphragm has its outer periphery beaded as at 31 and clamped between the motor housing members 14 and 17. The pressure responsive unit of the motor, including the diaphragm 30, divides the motor to form a variable pressure chamber 32 and an atmospheric chamber 33, the latter of which is open to the atmosphere through the slot 16. The body member 26 has a rearwardly extending sleeve portion 36 on which is pressed a preferably stainless steel tube 37 slidable through a combined bearing and sealing unit 38. Such unit is carried by the rear motor housing 17, as shown in FIGURE 2. The motor housing 14 is provided with an abutment 39 to engage the body member 25 of the pressure responsive unit of the motor under conditions and for a purpose to be described.

A manually operable member 40 is axially slidable in the sleeve portion 36 and is provided with a cap member 47 secured to the inner end thereof by a screw 48. The cap member 47 clamps against the inner end of the member 40 the inner periphery of a diaphragm 49, having its outer periphery clamped between the radially outer portions of the body members 25 and 26. A reaction washer 52 engages against the diaphragm 49, and th washer and diaphragm are biased toward the left in FIGURE 2 by a spring 53 to assume the normal position shown.

A rubber bumper 54 is carried by the member 40 and is engaged by the inner flange of the reaction washer 52 when the motor is energized, as will become apparent below. The sleeve portion 36 is grooved as at 55 to vent to the atmosphere the chamber in which the spring 53 is arranged.

A nut 58 is threaded in the body member 25 and provided with an in-turned flange 59 having an axial opening therethrough. A spring 60 has opposite ends respectively engaging the flange 59 and cap 47 to urge the latter and the elements connected thereto toward the off position shown in FIGURE 2.

A valve unit comprising elements 62 and 63 is mounted to slide in the body member 25. The latter member is provided with a forwardly extending axial portion 64 having a bore 65 in which the forward end of the member 62 is slidable. The forward end of this bore forms a chamber 66, and a spring 67 in such chamber biases the members 62 and 63 toward the right in FIGURE 2. The chamber 66 communicates through a lateral port 69 with the chamber 33 and thus with the atmosphere. An axial passage 71 is formed in the members 62 and 63. This passage opens at its forward end into the chamber 66 and at its rear end into a control chamber 72 formed rearwardly of the flange 69 and in which the spring 60 is arranged.

An annular flange 75 is formed on the nut 58 and the diaphragm 49 normally engages such flange. The flange 75 is grooved as at 76 so that the chamber 72 normally communicates with a radially outer chamber 77 which, in turn, communicates through passages 78 and 79 with the chamber 32.

The member 63 is provided with a rubber or similar valve 82 projecting slightly beyond the rear end of the member 63. The valve 82 is engageable with the cap 47 under conditions to be described, but is normally disengaged therefrom. The member 62 carries a similar rubber valve 83 normally engaged with the forward face of the flange 59.

The space surrounding the valve 83 forms a pressure chamber 84 communicating with the axial passage of a connector 85 extending through the slot 16. The connector 85 communicates with one end of a flexible hose 86 (FIGURE 1), further described below.

All of the parts of the motor 13 are shown in normal positions in FIGURE 2, the various elements associated with the valve mechanism being biased to such positions by the springs 53, 60, and 67. The pressure responsive unit of the motor as a whole is biased to off position by a return spring 88, and movement of the unit to off position is limited by engagement with the motor housing 17 of an annular bumper 89 formed on the diaphragm 30.

Movement is imparted to the member 40 by a push rod 92 having a hemispherical end 93 maintained in position by a rubber ring 94. A boot 95 is connected between the push rod 92 and the motor housing 17.

The motor as disclosed in FIGURE 2 forms per se no part of the present invention except as features thereof operate in combination with the remaining portions of the system, as described below. The motor per se is disclosed and claimed in the copending application of David T. Ayers, Jr., Serial No. 747,424, filed July 9, 1958, now Patent No. 2,953,120.

The rod 92 is pivoted at 96 to the upper end of a lever 97, the lower end of which is pivoted as at 98 to the bracket walls 12. A pedal-operated push rod 99 is pivoted as at 100 to the lever 97 intermediate its ends, and the rear end of the rod 99 (FIGURE 1) is connected as at 101 to a depending pedal lever 102 of conventional type. The pedal 102 operates over and rearwardly of a conventional toe board 103. The broken line position of the pedal in FIGURE 1 represents the maximum movement of the pedal toward the toe board, a position which is beyond the normal path of travel of the pedal. In the event of a failure in the hydraulic lines 112, no pressure will be built up in the master cylinder described below, in which case the body member 25 will engage automatic means to be described and in the event such means should fail, the body member 25 will engage the abutment 39 to limit movement of the pedal 102 while the latter is no lower than the broken line position shown in FIGURE 1. The valve mechanism of the motor 13 will still be subject to operation by the brake pedal, as further described below.

A conventional master cylinder indicated as a whole by the numeral 105 is secured in any suitable manner to the forward wall 15 of the motor housing 14. This master cylinder comprises a conventional reservoir 107 and a conventional master cylinder bore 108 in which is slidable the usual plunger 109, the rear end of which abuts the axial extension 64 to be actuated thereby. The plunger 109 is biased rearwardly by the usual spring 110 having its forward end preferably engaging a conventional residual pressure valve to be described. The pressure end of the bore 108 forms a chamber 111 communicating through lines 112 (FIGURE 1) with the conventional wheel cylinders 113. In a passenger vehicle, these will be the wheel cylinders for the front wheels, for reasons which will become apparent.

The motor 13 is shown in the present instance as being of the super-atmospheric pressure operated type. To furnish such pressure, the motor vehicle is provided with a suitable driven compressor 118 having its outlet piped as at 119 to an air reservoir 120. The outlet of such reservoir is provided with a conventional pressure regulating valve 121 piped as at 122 to the other end of the flexible hose 86.

In connection with the present construction, the abutment 39 constitutes an emergency stop to limit movement of the motor piston to the left. In accordance with the present invention however the motor is provided with means operative under certain conditions for preventing movement of the motor piston a substantial distance from its normal position. Such means is operative in conjunction with the slave motor referred to below, and will be described later.

Application of the rear vehicle brakes is accomplished through operation of a slave motor indicated as a whole by the numeral 125 (FIGURE 6). Such motor comprises a generally cylindrical body member 126 and a cap-like body member 127, which may be substantially identical with the body member 17 in FIGURE 2.

The housing members of the motor 125 are divided by a pressure responsive unit indicated as a whole by the numeral 130 to form an atmospheric channel 131 and a variable pressure chamber 132. The axially extending portion 133 of the motor housing member 127 houses a fitting 134 provided with an axial opening 135 communicating with the motor chamber 132. The fitting 134 is connected to one end of a pipe 138 (FIGURE 1), and the other end of this pipe connects with a fitting 139 communicating with the variable pressure chamber 32 of the motor 13. Pressure in the latter chamber accordingly will be communicated to the slave motor chamber 132.

The pressure responsive unit 130 of the slave motor is provided with a preferably die-cast body 142, over the periphery of which is pressed a preferably steel shell 143 on which is mounted a rolling diaphragm 144 having an outer peripheral bead 145 clamped between the adjacent flange portions of the housing members 126 and 127. The inner bead of the diaphragm 144 is fixed relative to the shell 143 by crimping the latter therearound as at 146. Movement of the pressure responsive unit to the off position in FIGURE 3 is limited by a rubber bumper 147 formed integral with the diaphragm 144. The body 142 is provided with an axially extended portion 150, further described below, and the pressure responsive unit 130 is biased to its off position by a spring 151.

A generally conventional master cylinder unit indicated as a whole by the numeral 154 is associated with the motor 125. The master cylinder unit comprises a master cylinder 155 having a bore 156 in which is slidable the rear portion of the axial extension 150, formed as a master cylinder plunger 157.

The plunger 157 forms with the master cylinder 155 a pressure chamber 160 communicating through a port 161 with lines 162 (FIGURE 1) leading to the rear wheel brake cylinders 163.

It will become apparent that successive operations of the brake system will alternately expel air from the chamber 131 and draw air thereinto. Accordingly, an air cleaning unit 165, annular in form, is arranged between adjacent walls of the motor housing 126 and master cylinder unit 154, thus cleaning air flowing into the chamber 131.

As previously stated, means is provided for limiting movement of the piston body 24 (FIGURE 2) to the left prior to the point at which it will be arrested by the abutment 39. The means referred to is automatic and if the system is functioning properly does not operate and the motor piston is free to move to whatever point is necessary to apply the front brakes. The automatic means referred to is provided to arrest movement of the piston of the master motor at an intermediate point in the event of a rupture in the fluid line 112 in accordance with which no pressure can be built up therein.

Referring to FIGURES 2 and 3, the motor casing 14 is provided with an enlargement 170 having a small cylinder 171 formed therein and in which a piston 172 is vertically slidable.

This piston is biased upwardly by a spring 173 and is subject to pressure in a chamber 174 above the piston 172 to compress the spring 173 for a purpose to be described. Pressure is supplied to the chamber 174 through a port 176 to which is connected a fluid line 177.

The enlargement 170 is provided with an opening 180 in which is mounted to rock a lever 181 pivoted on a screw 182 (FIGURE 5) having an up-turned end 184 arranged in a slot 185 formed in a stem 186 carried by and depending from the piston 172. The other end of the lever 181 is provided with a depending finger 188 projecting through an opening 189 in the motor casing 14 and arranged in its solid line position shown in FIGURES 2 and 3 to form an abutment to limit movement of the body 25 of the pressure responsive unit of the master motor 13.

The bore 108 of the master cylinder 105 is provided with a conventional residual pressure valve 191 opening into a chamber 192 to which the line 112 is connected. In the present case, the chamber 192 communicates through a lateral passage 193 with the other end of the line 177 leading to the chamber 174 (FIGURE 3). Thus the chamber 174 is always subjected at least to the residual pressure in the chamber 192 and the spring 173 may be of such strength as to be overcome by such residual pressure to normally maintain the lever 181 in its inoperative dotted line position shown in FIGURE 3. In such case, whenever there is at least residual pressure in the front wheel brake lines the abutment finger 188 will be inoperative and the system will function normally as described below. It will become apparent that the valve mechanism of the motor 13 controls the supply of fluid pressure to the working chambers of both motors, and in the event of a failure in the fluid line 112, the spring 173 moves the piston 172 upwardly, thus moving the finger 188 into the path of travel of the piston body 25 after which operation of the brake pedal will operate the valve mechanism to cause the slave motor in FIGURE 6 to function even though the piston of the master motor 13 is incapable of generating pressure in the front wheel brake lines.

*Operation*

FIGURE 2 shows the parts of the master or booster motor in normal positions, the variable pressure motor chamber 32 communicating with the atmosphere through the various passages and chambers 79 and 78, 76, 72, 71, 66, 69, and 33. The high pressure or application valve 83 will be closed, a shown, and accordingly superatmospheric pressure cannot pass beyond the chamber 84. When the brake pedal 102 is operated, the rod 99 (FIGURE 2) will be moved to the left, and the lever 97 will similarly move the rod 92 and member 40. The forward face of the cap 47 will engage the valve 82, thus closing the atmospheric passage 71 to the chamber 72, and the valve elements will be in lap positions.

Slight further movement of the brake pedal will cause the cap 47 to effect axial movement of the members 62 and 63, thus opening valve 83 to connect the high pressure chamber 84 to the chamber 72. This chamber communicates with the motor chamber 32 as described above, and accordingly the initial cracking of the valve 83 builds up differential pressures on opposite sides of the pressure responsive unit 24 to move the latter toward the left from the position shown in FIGURE 2. Thus fluid displacing movement of the plunger 109 will start, and initial operation of the plunger 109 will effect movement of the brake shoes into engagement with the brake drums of the front vehicle wheels. It will be apparent that the motor chamber 32 communicates through the line 138 (FIGURE 1) with the motor chamber 132 (FIGURE 6), and the same differential pressures which exist on opposite sides of the pressure responsive unit 24 of the master motor will exist on opposite sides of the pressure responsive unit 130 of the slave motor. Accordingly, the plunger 157 will displace fluid from the chamber 160 to move the brake shoes of the rear wheels into engagement with their drums. The pressure in the master cylinder chambers 111 and 160 will be approximately equal.

Initial movement of the brake pedal described above takes place solely against resistance of the spring 60. As soon as the valve 83 is cracked and a slight increase in pressure occurs in the chamber 72, the pressure will act against left-hand surface portions of the cap 47 to tend slightly to resist movement of the member 40 by the brake pedal, thus providing the brake pedal with a slight degree of reaction. An initial increase in pressure in the chambers 72 and 77 will not immediately affect the diaphragm 49, however, since the spring 53 tends to maintain the diaphragm in engagement with the shoulder 75. When pressure in the chamber 77 increases to the point where the loading of the spring 53 is overcome, the diaphragm 49 will move away from the shoulder 75 and its reactionary force will be applied to the bumper 54 to be added to that of the cap 47, thus providing a second stage of reaction against the brake pedal.

It will be particularly noted that the admission of a given quantity of air at given pressure into the motor chamber 32 does not merely reflect itself in reaction against the brake pedal since the chamber 32 communicates with the slave motor chamber 132 (FIGURE 3). Thus the reaction pressures in early stages of brake reaction will reflect the pressures in the variable pressure chambers of both of the motors. Thus the "feel" reacting against the brake pedal will be a reflection of the degree of application of both the forward and rear brakes. This is important in providing accurate reaction against the brake pedal in a system of this character, and the accuracy of the reaction is preserved by the fact that all of the parts of the master motor in FIGURE 2 are coaxial to eliminate any eccentricity, or angular application of forces. The accuracy is also enhanced by the fact that the type of motor illustrated is practically completely lacking in any artificial resistances to movement of the parts incident to the use of pressure seals. The only seal employed with respect to the axially pedal movable elements of the motor is the small seal surrounding the member 62, which seal offers substantially negligible resistance.

It will be apparent in view of the foregoing that the mechanism provides an initial soft pedal, followed by a stage of reaction transmitted to the brake pedal as soon as super-atmospheric pressure is supplied to the chamber 72, and such reaction will be proportional to the equal pressure existing in the motor chambers 32 and 132.

The conditions referred to take place throughout what may be termed normal brake applications, that is applications which take place to an extent which is within the limits of the full energization of the motors 13 and 125. Thus a highly accurate reaction is provided which remains proportional, during average brake applications, to the same pressure existing in the variable pressure chambers of the two motors. Under such conditions there will never be any reaction against the brake pedal at a ratio greater with respect to the motor 13 than with respect to the motor 125.

In the event of a full or "panic" application of the brakes the member 40 will be moved to the left to its limit of movement relative to the pressure responsive unit, under which conditions the peripheral portions of the cap 47 will engage the annular shoulder within the shoulder 75. Thus, when the motor 13 is energized to its full extent, further application of the front wheel brakes may be effected, limited only by the ability of the operator to exert force against the brake. Thus greater applications of the front wheel brakes in a passenger vehicle can be secured, but this will not affect the application of the rear wheel brakes, which can be applied with progressively increasing force only up to the maximum degree of energization of the slave motor 125. This limiting of the maximum application of the rear wheel brakes usually prevents the locking and skidding of the rear wheels, and the maintaining of traction between the rear wheels and the highway thus provides for maximum deceleration of the rear wheels and of the vehicle as a whole.

Upon the releasing of the brake pedal, the spring 60 will move the cap 47 toward the right and the members 62 and 63 will follow such movement because of the operation of the spring 67, until the valve 83 engages the flange 59. Further movement of the cap 47 to the right in FIGURE 2 will then open the valve 82 and restore communication between the chamber 72 and the atmospheric passage 71 to exhaust pressure from the motor chamber 32 into the motor chamber 33. The same exhaustion of air takes place from the slave motor, since the pipe 138 communicates with the chamber 32. The return springs 88 and 151 of the respective motors will return the pressure responsive units thereof to their normal off positions. Of course, the exhausting of pressure from the chamber 72 relieves the pressure acting against the diaphragm 49, and the spring 53 will move the diaphragm to its normal position in engagement with the flange 75.

The type of motor illustrated in FIGURE 2 is important for a further reason, namely, to take care of possible emergencies. If the hydraulic lines 162 (FIGURE 1) to the rear wheel brakes should be ruptured so that no pressure can be built up in the chamber 160, operation of the valve mechanism will move the pressure responsive unit 130 to its limit of movement, and the valve mechanism of the master motor 13 will then operate such motor to apply the front wheel brakes.

If a rupture should occur in the line 112 (FIGURE 1) to the front wheel brake cylinders, no pressure can be built up in the chamber 111 (FIGURE 2) and with no resistance against its movement, the pressure responsive unit 24 will be free to move forward as viewed in FIGURE 2. In accordance with the disclosure in my copending application Serial No. 802,349, referred to above, in which the detent finger 188 is not employed, the pressure responsive unit under such conditions would move to the left in FIGURE 2 in engagement with abutment 39, thus preventing further movement of the responsive unit 24 and of the seats for the valves 82 and 83. This would occur before the pedal 102 reached its limit of movement and accordingly the operator, starting from the pedal position, would operate the valves 82 and 83 to admit pressure into the motor chamber 32 and thence line 138 to the slave motor 125 to apply the rear brakes. While such a rupture in the line 112 is quite rare, it has occurred and it has been noted that there is a tendency for the driver to assume that the master cylinder needs pumping to replenish the hydraulic fluid in the line 112. This pedal pumping action of course is useless if the line 112 is broken, and in so doing, the operator fails to operate the valves 82 and 83 and accordingly the slave motor 125 does not function. The principal feature of the present invention is intended to overcome this disadvantage.

As is well known, substantial residual pressure is maintained in the hydraulic brake lines, and this pressure is sufficient to maintain the piston 172 (FIGURE 3) in its lower position with the finger 188 in its upper dotted line position. Thus during normal brake application, the finger 188 does not interfere with movement of the pressure responsive unit 24. If the line 112 should rupture, there would be a drop in pressure in the chamber 174 and the spring 173 would move upwardly to swing the lever 181 and move the finger 188 to its oprative position. Upon free movement of the pressure responsive unit 24, the finger 188 would form an abutment to limit movement of the pressure responsive unit 24 without its traveling the full distance into engagement with the abutment 39. The operator thereafter can depress the brake pedal to operate the valves 82 and 83 to energize the slave motor 125 to apply the rear brakes and thus stop the vehicle.

It will be noted that pressure for the chamber 174 (FIGURE 3) is derived from the chamber 192 (FIGURE 4) beyond the residual pressure valve 191 and the residual pressure may be relied on to maintain the finger 188 in inoperative position. If, without a rupture in the line 112, the residual pressure in such line should drop to release the piston 172, operation of the master motor 13 in the first portion of its movement from off position would restore pressure in the chamber 192 (FIGURE 4) and hence in the chamber 174 (FIGURE 3) and accordingly element 188 would be immediately moved to inoperative position so as to not interfere with movement of the pressure responsive unit 24. Thus it will be apparent that the present device adds to the already highly efficient pressure system an added safety feature.

The abutment 39 still remains in position and if for any reason the piston 172 should fail to move the finger 188 to its operative position when desired, the pressure responsive unit 124 would still engage the abutment 39 to render the pedal 102 operative as described above for controlling the slave motor 125.

When the slave motor alone is operated under the emergency conditions stated, the brake pedal is still provided with feel reaction. The pressure to which the slave motor is subjected will act against the members 47 and 49 to react against the brake pedal in accordance with pressure admitted through the pressure inlet valve 83.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure power system comprising a master motor having a first pressure responsive unit and a first pressure chamber, a first work-performing member connected to said first pressure responsive unit, a slave motor having a second pressure responsive unit and a second pressure chamber, a second work-performing member connected to said second pressure responsive unit, a valve mechanism having parts movable with said first pressure responsive unit and cooperative parts movable relative to such pressure responsive unit to control communication between said first pressure chamber and a source of fluid pressure, the pressure chambers of said motors communicating with each other whereby the admission of pressure to said first pressure chamber admits pressure to said second pressure chamber, said first pressure responsive unit being movable at least through a predetermined travel from a normal off position to operate said first work-performing member, and means automatically operative upon a failure of resistance to movement of said first work-performing member under which conditions said first pressure responsive unit moves relatively freely from said off position for limiting the travel of such pressure responsive unit whereby the operation of said cooperative parts of said valve mechanism will supply pressure to said first pressure chamber and thus to said second pressure chamber to operate said second work-performing member.

2. A fluid pressure power system comprising a master motor having a first pressure responsive unit and a first pressure chamber, a first work-performing member connected to said first pressure responsive unit, a slave motor having a second pressure responsive unit and a second pressure chamber, a second work-performing member connected to said second pressure responsive unit, a valve mechanism having parts movable with said first pressure responsive unit and cooperative parts movable relative to such pressure responsive unit to control communication between said first pressure chamber and a source of fluid pressure, the pressure chambers of said motors communicating with each other whereby the admission of pressure to said first pressure chamber admits pressure to said second pressure chamber, said first pressure responsive unit being movable at least through a predetermined travel from a normal off position to operate said first work-performing member, a normally inoperative abutment movable to an operative position in the path of travel of said first pressure responsive unit for substantially limiting the travel of such pressure responsive unit from said normal off position, and means operative upon a failure of resistance to movement of said first work-performing member, under which condition said first pressure responsive unit moves relatively freely from said normal off position, for moving said abutment to operative position so that operation of said cooperative parts of said valve mechanism will supply pressure to said first pressure chamber and thus to said second pressure chamber to operate said second work-performing member.

3. A motor vehicle braking system comprising a master motor having a pressure responsive unit, a master cylinder operated by said pressure responsive unit, hydraulic lines connecting said master cylinder to one set of vehicle brake cylinders, a slave motor having a pressure responsive unit, a master cylinder connected to such pressure responsive unit, hydraulic lines connecting said last-named master cylinder to the remaining wheel cylinders, each motor having a pressure chamber, a valve mechanism having parts movable with the pressure responsive unit of said master motor and cooperative parts movable relative to such pressure responsive unit to control communication between the pressure chamber of said master motor and a source of fluid pressure, the pressure chambers of said motors communicating with each other whereby the admission of pressure to the pressure chamber of said master motor admits pressure to the pressure chamber of said slave motor, the pressure responsive unit of said master motor being movable at least through a predetermined travel from a normal off position to operate said one set of wheel cylinders, and means automatically operative upon a failure in pressure in said hydraulic lines to said one set of wheel cylinders for limiting the travel of the pressure responsive unit of said master motor whereby operation of said cooperative parts of said valve mechanism will supply pressure to the pressure chamber of said master motor and thus to the pressure chamber of said slave motor to operate said remaining wheel cylinders.

4. A motor vehicle braking system comprising a master motor having a pressure responsive unit, a master cylinder operated by said pressure responsive unit, hydraulic lines connecting said master cylinder to one set of vehicle brake cylinders, a slave motor having a pressure responsive unit, a master cylinder connected to such pressure responsive unit, hydraulic lines connecting said last named master cylinder to the remaining wheel cylinders, each motor having a pressure chamber, a valve mechanism having parts movable with the pressure responsive unit of said master motor and cooperative parts movable relative to such pressure responsive unit to control communication between the pressure chamber of said master motor and a source of fluid pressure, the pressure chambers of said motors communicating with each other whereby the admission of pressure to the pressure chamber of said master motor admits pressure to the pressure chamber of said slave motor, the pressure responsive unit of said master motor being movable at least through a predetermined travel from a normal off position to operate said one set of wheel cylinders, a normally inoperative abutment movable to an operative position in the path of travel of the pressure responsive unit of said master motor for substantially limiting the travel of such pressure responsive unit from said normal off position, and means operative upon a failure in pressure in said hydraulic lines to said one set of wheel cylinders for moving said abutment to said operative position so that operation of said cooperative parts of said valve mechanism will supply pressure to the pressure chamber of said master motor and thus to the pressure chamber of said slave motor to operate said remaining wheel cylinders.

5. A motor vehicle braking system comprising a master motor having a pressure responsive unit, a master cylinder operated by said pressure responsive unit, hydraulic lines connecting said master cylinder to one set of vehicle brake cylinders, a slave motor having a pressure responsive unit, a master cylinder connected to such pressure responsive unit, hydraulic lines connecting said last-named master cylinder to the remaining wheel cylinders, each motor having a pressure chamber, a valve mechanism having parts movable with the pressure responsive unit of said master motor and cooperative parts movable relative to such pressure responsive unit to control communication between the pressure chamber of said master motor and a source of fluid pressure, the pressure chambers of said motors communicating with each other whereby the admission of pressure to the pressure chamber of said master motor admits pressure to the pressure chamber of said slave motor, the pressure responsive unit of said master motor being movable at least through a predetermined travel from a normal off position to operate said one set of wheel cylinders, a normally inoperative abutment movable to an operative position in the path of travel of the pressure responsive unit of said master motor for substantially limiting the travel of such pressure responsive unit from said normal off position, means biasing said abutment to said operative position, and means responsive to pressure in said hydraulic lines to said one set of wheel cylinders for normally overcoming said biasing means whereby, upon a failure in pressure in such hydraulic lines, said biasing means will move said abutment to operative position so that operation of said cooperative parts of said valve mechanism will supply pressure to the pressure chamber of said master motor and thus to the pressure chamber of said slave motor to operate said remaining wheel cylinders.

6. A system according to claim 5 wherein said means responsive to pressures in said hydraulic lines to said one set of wheel cylinders comprises a cylinder communicating with such hydraulic lines, and a hydraulic line connected between said last-named cylinder and said hydraulic lines to said one set of wheel cylinders.

7. A motor vehicle braking system comprising a master motor having a pressure responsive unit, a master cylinder operated by said pressure responsive unit, hydraulic lines connecting said master cylinder to one set of vehicle wheel cylinders, a slave motor having a pressure responsive unit, a master cylinder connected to such pressure responsive unit, hydraulic lines connecting said last-named master cylinder to the remaining wheel cylinders, each motor having a pressure chamber, a valve mechanism having parts movable with the pressure responsive unit of said master motor and cooperative parts movable relative to such pressure responsive unit to control communication between the pressure chamber of said master motor and a source of fluid pressure, the pressure chambers of said motors communicating with each other whereby the admission of pressure to the pressure chamber of said master motor admits pressure to the pressure chamber of said slave motor, the pressure responsive unit of said master motor being movable at least through a predetermined travel from a normal off position to operate said one set of wheel cylinders, and control means comprising an abutment movable between an inoperative position out of the path of travel of the pressure responsive unit of said master motor and an operative position in the path of travel of such unit for limiting its movement from said normal position whereby, when said pressure responsive unit of said master motor is stopped by said abutment, operation of said cooperative parts of said valve mechanism will supply pressure to the pressure chamber of said master motor and thus to the pressure chamber of said slave motor to operate said remaining wheel cylinders, said control means further comprising means biasing said abutment to said operative position, and means operative by pressure in said hydraulic lines to said one set of wheel cylinders for normally overcoming said biasing means.

8. A system according to claim 7 wherein said means for normally overcoming said biasing means comprises a control cylinder having a plunger therein connected to said abutment, and a hydraulic line connecting said control cylinder to said hydraulic lines to said one set of wheel cylinders.

9. A system according to claim 8 wherein said control cylinder has one end connected to said last-named hydraulic line, said biasing means being arranged in the other end of said control cylinder and engaging said plunger.

10. A motor vehicle braking system comprising a master motor having a pressure responsive unit, a master cylinder operated by said pressure responsive unit, hydraulic lines connecting said master cylinder to one set of vehicle brake cylinders, a slave motor having a pressure responsive unit, a master cylinder connected to such pressure responsive unit, hydraulic lines connecting said last-named master cylinder to the remaining wheel cylinders, each motor having a pressure chamber, a valve mechanism having parts movable with the pressure responsive unit of said master motor and cooperative parts movable relative to such pressure responsive unit to control communication between the pressure chamber of said master motor and a source of fluid pressure, the pressure chambers of said motors communicating with each other whereby the admission of pressure to the pressure chamber of said master motor admits pressure to the pressure chamber of said slave motor, the pressure responsive unit of said master motor having a substantially predetermined work stroke from a normal off position, a stationary abutment beyond said work stroke engageable with said pressure responsive unit of said master motor for limiting its movement beyond said work stroke in the event of a failure of pressure in said hydraulic lines, and means comprising a movable abutment movable into the path of travel of said pressure responsive unit of said master motor substantially ahead of the limit of said work stroke upon a failure in pressure in said hydraulic lines to said one set of wheel cylinders for limiting the travel of the pressure responsive unit of said master motor whereby operation of said cooperative parts of said valve mechanism will supply pressure to the pressure chamber of said master motor and thus to the pressure chamber of said slave motor to operate said remaining wheel cylinders, said stationary abutment performing the same function as said movable abutment in the event of a failure in operation of said movable abutment.

11. A system according to claim 10 wherein said movable abutment is normally arranged out of the path of travel of the pressure responsive unit of said master motor, and means operative upon a failure of pressure in said hydraulic lines to said one set of wheel cylinders for moving said movable abutment to a position in the path of travel of said pressure responsive unit of said master motor.

12. A system according to claim 10 provided with means biasing said movable abutment to an operative position in the path of travel of the pressure responsive unit of said master motor, and means operated by pressure in said hydraulic lines to said one set of wheel cylinders for normally overcoming said biasing means whereby, upon a loss in pressure in such hydraulic lines, said biasing means will move said movable abutment into the path of travel of the pressure responsive unit of said master motor.

<center>No references cited.</center>